F. L. SMITH.
AUTOMATIC FOOT THROTTLE FOR AUTOMOBILES.
APPLICATION FILED JUNE 10, 1916.
1,209,632.
Patented Dec. 19, 1916.
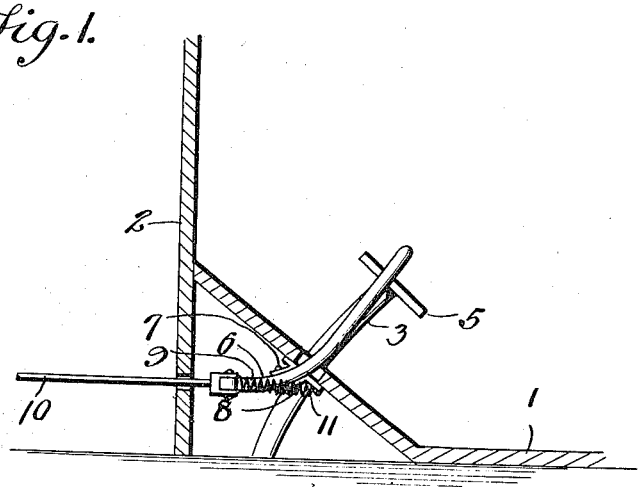
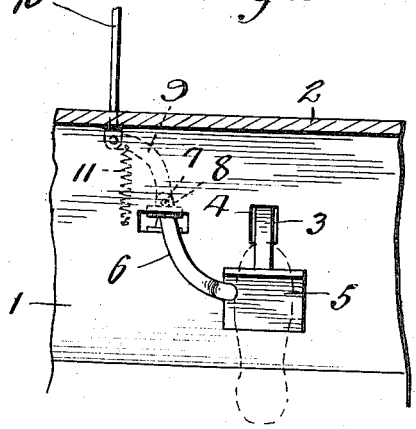
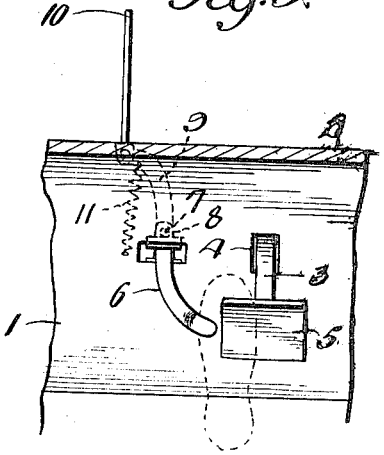
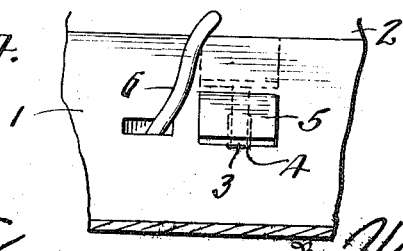

UNITED STATES PATENT OFFICE.

FRANK L. SMITH, OF CHICAGO, ILLINOIS.

AUTOMATIC FOOT-THROTTLE FOR AUTOMOBILES.

1,209,632.  Specification of Letters Patent.  Patented Dec. 19, 1916.

Application filed June 10, 1916. Serial No. 102,919.

*To all whom it may concern:*

Be it known that I, FRANK L. SMITH, a citizen of the United States, residing at Chicago, in the county of Cook and State of Illinois, have invented new and useful Improvements in Automatic Foot-Throttles for Automobiles, of which the following is a specification.

This invention relates to automatic foot throttles for automobiles and other motor driven vehicles, the object in view being to provide a novel arrangement of throttle lever which is so disposed relatively to the brake pedal that the throttle lever may be operated by the foot of the driver either to accelerate or throttle the engine, the relative arrangement of the parts being such that when the brake pedal is pushed toward brake-setting position, the throttle lever will be automatically moved into a position in which it will operate to throttle the engine and prevent the same from racing, the arrangement being further such that when the brake pedal is permitted to return to its inactive position, the throttle lever will again be automatically moved to a position to accelerate the engine.

With the above and other objects in view, the invention consists in the novel construction, combination and arrangement of parts, as herein described, illustrated and claimed.

In the accompanying drawings:—Figure 1 is a fragmentary vertical longitudinal section showing the automatic throttle lever of this invention in its applied position and relation to the brake pedal. Fig. 2 is a plan view of the same showing the normal position of the throttle lever. Fig. 3 is another plan view illustrating the manner of moving the throttle lever to accelerating position. Fig. 4 is a view showing the position assumed by the throttle lever when the brake pedal is depressed.

Referring to the drawings 1 designates the floor of a motor vehicle which is usually inclined upwardly toward the dash represented at 2.

3 designates the brake lever which operates through an opening 4 in the floor 1, and 5 designates the brake pedal which is usually rigid with the brake lever or arm 3.

6 designates the throttle lever of this invention, the same being fulcrumed on a pin 7 arranged by preference in an opening 8 in the floor 1, the lever being provided with two arms, 6 designating the longer arm of the lever and 9 the shorter arm of the lever which is located beneath the floor 1. Attached to the extremity of the arm 9 of the lever is the usual throttle rod 10 which connects at its opposite end to the throttle valve of the carbureter. A spring 11 connects the end of the arm 9 of the lever with the floor or frame of the machine and serves to hold the free end of the lever arm 6 toward the center of the brake pedal 5.

The parts hereinabove described are so arranged that the free end of the throttle lever is normally held toward the center of the pedal 5 by means of the spring 11. The operator by placing his foot on the pedal 5 and moving the same in the direction of the throttle lever, may swing said lever on its pivot or axis 7 thereby pushing forward on the rod 10 which acts in such movement to open the throttle valve of the carbureter and thereby accelerate the speed of the engine. By moving his foot in the opposite direction, the throttle lever is allowed to return to its normal position, pulling rearwardly on the rod 10 and moving the throttle valve of the carbureter toward its closed position. In case the throttle lever is in a position to hold the throttle valve of the carbureter partially or fully open, when the operator presses downwardly on the pedal 5, the edge of the sole of his shoe rides against the edge of the arm 6 of the throttle lever, the said edge being pitched at such an angle that in such movement of the foot, the free end of the throttle lever automatically moves inwardly over the foot of the operator under the action of the spring 11 thereby throttling down the engine and preventing the same from racing. As the operator allows the pedal 5 to ascend, the edge of the sole of the shoe operates to push the arm 6 of the throttle lever outwardly again or away from the pedal 5 thereby again opening the throttle valve of the carbureter to the extent to which it was previously opened, the engine speed being thus raised to the point where it was previous to the depression of the brake pedal.

The construction above described is extremely simple, inexpensive to manufacture and in practice has been found absolutely reliable in use, adding greatly to the safety of driving an automobile or motor vehicle in that the engine is automatically throttled simultaneously with the application of the brake or brakes. Furthermore, the automatic throttle may be applied to cars already in use without any material alteration and may therefore be sold as an accessory or attachment. Furthermore, it is practically impossible for the automatic throttle to get out of order.

Having thus described my invention, I claim:—

The combination with a brake pedal, of a throttle lever located at one side of the brake pedal and pivotally mounted on an axis which permits the free end of the throttle lever to be moved laterally with relation to the movement of the brake pedal, a throttle valve-operating rod attached to said throttle lever, and a spring acting to yieldingly hold the free end of the throttle lever toward the center of the brake pedal.

In testimony whereof I affix my signature in presence of two witnesses.

FRANK L. SMITH.

Witnesses:
H. J. LUND,
J. W. HIESTAND.

Copies of this patent may be obtained for five cents each, by addressing the "Commissioner of Patents, Washington, D. C."